(12) United States Patent
Strybos et al.

(10) Patent No.: US 9,656,807 B2
(45) Date of Patent: May 23, 2017

(54) HYDROGEN CAVERN PAD GAS MANAGEMENT

(71) Applicant: Air Liquide Large Industries U.S. LP, Houston, TX (US)

(72) Inventors: Ronald Strybos, Kountze, TX (US); Azadeh Dony, Katy, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 0 days.

(21) Appl. No.: 14/468,531

(22) Filed: Aug. 26, 2014

(65) Prior Publication Data

US 2015/0321848 A1 Nov. 12, 2015

Related U.S. Application Data

(63) Continuation of application No. 14/272,669, filed on May 8, 2014.

(51) Int. Cl.
*B65G 5/00* (2006.01)
*F17C 1/00* (2006.01)
*F17C 7/00* (2006.01)

(52) U.S. Cl.
CPC ............... *B65G 5/00* (2013.01); *F17C 1/007* (2013.01); *F17C 7/00* (2013.01);
(Continued)

(58) Field of Classification Search
CPC ....... Y02E 60/321; Y02E 60/322; B65G 5/00; F17C 2270/012; F17C 2270/0152; F17C 2270/0155; F17C 11/007
(Continued)

(56) References Cited

U.S. PATENT DOCUMENTS

| 1,923,896 A | 8/1933 | Trump |
| 2,009,534 A | 7/1935 | Trump |

(Continued)

FOREIGN PATENT DOCUMENTS

| DE | 101 17 617 | 10/2002 |
| EP | 0 086 506 | 8/1938 |

(Continued)

OTHER PUBLICATIONS

Berest, P., "International Gas Union Research Conference 2011: Thermomechanical aspects of high frequency cycling in salt storage caverns," 2011, 22 pgs.
(Continued)

*Primary Examiner* — Tara M. Pinnock
(74) *Attorney, Agent, or Firm* — Elwood L. Haynes

(57) ABSTRACT

A method of pad gas management in an underground storage volume including storing a first compressible fluid, determining a transient minimum operating pressure ($P_{trans}$), measuring the pressure ($P_{act}$), removing at least a portion of the first compressible fluid, concurrently, introducing an incompressible fluid, thereby producing a transient pressure condition controlled by the flow rate of the incompressible fluid, such that $P_{trans} < P_{act}$. The method may also include a length of casing, permanently cemented into the surrounding rock formations, with a final cemented casing shoe defining the practical endpoint at an approximate depth ($D_{casing}$), determining a transient pressure gradient ($G_{trans}$) for the underground storage volume, wherein $P_{trans} < D_{casing} \times G_{trans}$. The maximum removal of the first compressible fluid is controlled such that $P_{min} < P_{act}$, and wherein the transient pressure condition has a duration (D) of less than 7 days, more preferably less than 5 days.

7 Claims, 1 Drawing Sheet

(52) U.S. Cl.
CPC .. *F17C 2221/012* (2013.01); *F17C 2221/013* (2013.01); *F17C 2221/014* (2013.01); *F17C 2221/016* (2013.01); *F17C 2221/017* (2013.01); *F17C 2221/031* (2013.01); *F17C 2223/0123* (2013.01); *F17C 2223/035* (2013.01); *F17C 2225/0123* (2013.01); *F17C 2225/035* (2013.01); *F17C 2225/036* (2013.01); *F17C 2250/043* (2013.01); *F17C 2250/0491* (2013.01); *F17C 2250/0626* (2013.01); *F17C 2270/0152* (2013.01); *F17C 2270/0155* (2013.01); *Y02E 60/321* (2013.01); *Y02E 60/322* (2013.01)

(58) Field of Classification Search
USPC ........... 405/52, 53, 59; 222/394; 210/170.01
See application file for complete search history.

(56) References Cited

U.S. PATENT DOCUMENTS

| | | | |
|---|---|---|---|
| 2,073,053 A | | 3/1937 | Ducommun et al. |
| 2,229,140 A | | 1/1941 | Smith et al. |
| 2,284,869 A | | 6/1942 | Hinderliter |
| 2,346,392 A | | 4/1944 | Protin et al. |
| 2,402,862 A | | 6/1946 | Wright |
| 2,787,455 A | | 4/1957 | Knappen |
| 2,878,165 A | | 3/1959 | Cottle |
| 3,056,265 A | * | 10/1962 | Swinney ................ 405/59 |
| 3,148,000 A | | 9/1964 | Dahms et al. |
| 3,289,609 A | | 12/1966 | Palo |
| 3,438,203 A | | 4/1969 | Lamb et al. |
| 3,807,181 A | * | 4/1974 | Kuhne ................ 405/59 |
| 3,848,427 A | | 11/1974 | Loofbourow |
| 4,342,911 A | | 8/1982 | French |
| 4,365,978 A | | 12/1982 | Scott |
| 4,377,397 A | | 3/1983 | Clements |
| 4,422,859 A | | 12/1983 | McGee |
| 4,538,414 A | | 9/1985 | Saleh |
| 4,592,677 A | | 6/1986 | Washer |
| 4,616,669 A | | 10/1986 | Washer et al. |
| 4,632,601 A | | 12/1986 | Kuwada |
| 4,720,995 A | | 1/1988 | Thiel |
| 4,789,101 A | | 12/1988 | Kempf |
| 4,919,822 A | | 4/1990 | Boulanger |
| 5,207,530 A | | 5/1993 | Brooks et al. |
| 5,246,273 A | | 9/1993 | Rosar |
| 5,333,465 A | | 8/1994 | McBride |
| 5,336,083 A | | 8/1994 | Rajewski |
| 5,431,482 A | | 7/1995 | Russo |
| 5,486,811 A | | 1/1996 | Wehrle et al. |
| 5,496,893 A | | 3/1996 | Gagne et al. |
| 5,511,905 A | | 4/1996 | Bishop et al. |
| 5,957,539 A | | 9/1999 | Durup et al. |
| 6,412,508 B1 | | 7/2002 | Swann |
| 6,527,002 B1 | | 3/2003 | Szakaly |
| 6,579,454 B2 | | 6/2003 | Kaske |
| 7,078,011 B2 | | 7/2006 | Morrow et al. |
| 7,097,386 B2 | | 8/2006 | Maduell et al. |
| 7,152,675 B2 | | 12/2006 | Heard |
| 7,905,251 B2 | | 3/2011 | Flanders |
| 8,002,498 B2 | | 8/2011 | Leone et al. |
| 8,690,476 B2 | * | 4/2014 | Oates ................ 405/56 |
| 8,757,926 B2 | | 6/2014 | Drnevich |
| 8,814,133 B2 | | 8/2014 | Li et al. |
| 2002/0174895 A1 | | 11/2002 | Hill et al. |
| 2003/0025381 A1 | | 2/2003 | Pickren |
| 2004/0136784 A1 | | 7/2004 | Dahlem et al. |
| 2004/0238081 A1 | | 12/2004 | Yoshinaga et al. |
| 2005/0220704 A1 | | 10/2005 | Morrow et al. |
| 2006/0150640 A1 | | 7/2006 | Bishop |
| 2008/0127654 A1 | | 6/2008 | Darling et al. |
| 2008/0257542 A1 | | 10/2008 | Brisco et al. |
| 2009/0010714 A1 | | 1/2009 | Bishop |
| 2010/0276156 A1 | | 11/2010 | Jennings |
| 2011/0100213 A1 | | 5/2011 | Finkenrath et al. |
| 2011/0127825 A1 | | 6/2011 | Hughes et al. |
| 2011/0305515 A1 | * | 12/2011 | Drnevich ............ 405/53 |
| 2012/0174569 A1 | | 7/2012 | Ingersoll et al. |
| 2013/0213479 A1 | | 8/2013 | Oates et al. |
| 2013/0315669 A1 | | 11/2013 | Oates |
| 2014/0241802 A1 | * | 8/2014 | Drnevich ............ 405/53 |
| 2015/0137578 A1 | | 5/2015 | Colomé |

FOREIGN PATENT DOCUMENTS

| | | |
|---|---|---|
| GB | 2 460 550 | 12/2009 |
| WO | WO 2013 173709 | 11/2013 |

OTHER PUBLICATIONS

Devries, K.L. et al., "Cavern roof stability for natural gas storage in bedded salt," Jun. 2005, 191 pgs. (cited in Office Action issued Oct. 10, 2014 for related U.S. Appl. No. 14/468,615).

Barron, T.F., "Regulatory, technical pressures prompt more U.S. salt-cavern gas storage," Oil and Gas Journal, Pennwell, Houston, TX, US, vol. 92, No. 37, Sep. 12, 1994, 55-67.

Pottier, J.D. et al., "Mass storage of hydrogen," Proceedings of the NATO Advanced Study Institute series, Series E, Applied Sciences; Hydrogen Energy System: Production and Utilization of Hydrogen and Future Aspects, vol. 295, Jan. 1, 1995, 167-179.

Electric Power Research Institute, "Carbon Steel Handbook," Mar. 2007, 172 pgs.

Flowserve, "Forged Steel ASMT A350 Grade LF2 Valves," webpage, 2009, 2 pgs.

Fomas Group, "Oil and Gas," 2015, 24 pgs.

Welker Engineering, "Particular Material Appraisal Grade LF2 Class 1 According to ASME SA-350," Jun. 2, 2004, 3 pgs.

International Search Report and Written Opinion for corresponding PCT/US2015/029646, Oct. 16, 2015.

* cited by examiner

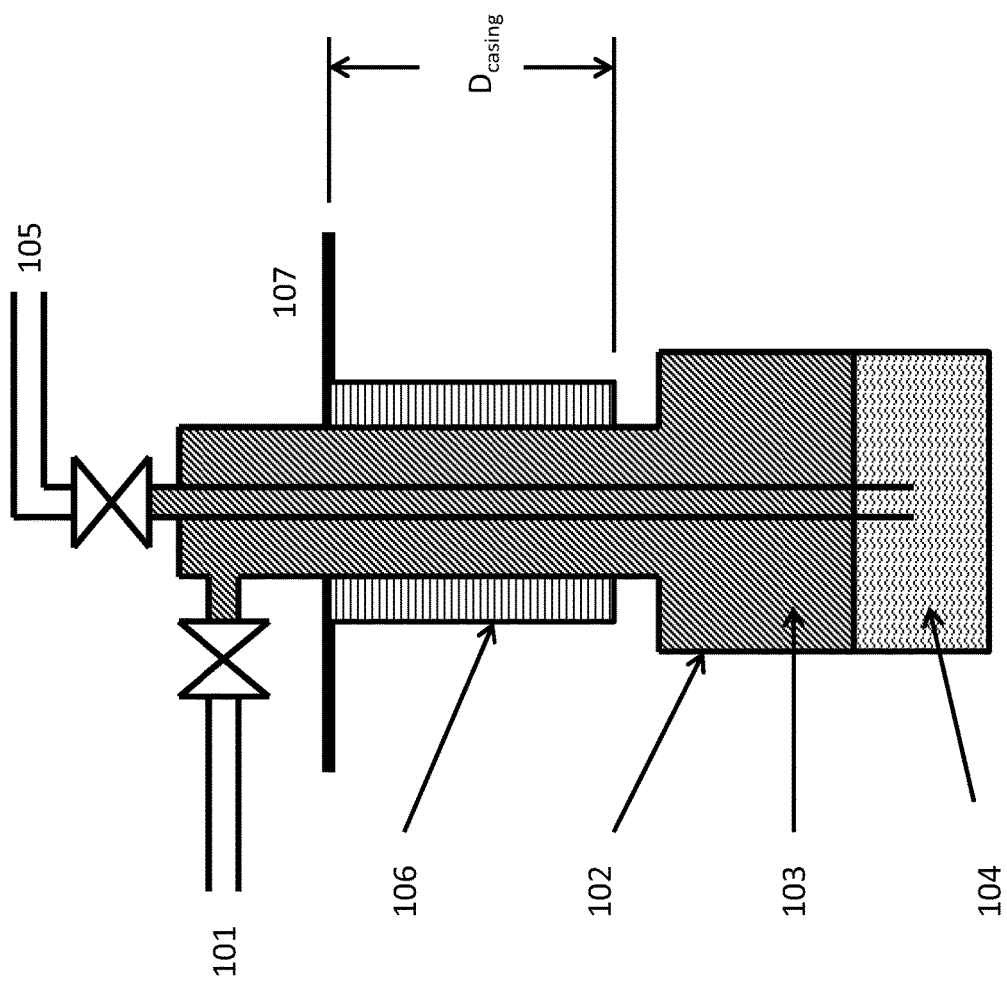

HYDROGEN CAVERN PAD GAS MANAGEMENT

CROSS REFERENCE TO RELATED APPLICATIONS

This application is a continuation of U.S. patent application Ser. No. 14/272,669 filed May 8, 2014, the entire contents of which are incorporated herein by reference.

BACKGROUND

Hydrogen is commonly supplied to customers that are connected to a supplier's hydrogen pipeline system. Typically, the hydrogen is manufactured by steam methane reforming in which a hydrocarbon such as methane and steam are reacted at high temperature in order to produce a synthesis gas containing hydrogen and carbon monoxide. Hydrogen may then be separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream.

Typically, hydrogen is supplied to customers under agreements that require availability and reliability for the steam methane reformer or hydrogen recovery plant. When a steam methane reformer is taken off-line for unplanned or extended maintenance, the result could be a violation of such agreements. Additionally, there are instances in which customer demand can exceed hydrogen production capacity of existing plants in the short term. Having a storage facility to supply back-up hydrogen to the pipeline supply is therefore desirable in connection with hydrogen pipeline operations.

Considering that hydrogen production plants on average have production capacities that are roughly 50 million standard cubic feet per day, a storage facility for hydrogen that would allow a plant to be taken off-line, to be effective, would need to have storage capacity in the order of 1 billion standard cubic feet or greater.

In order to provide this large storage capacity, high pressure gases, such as but not limited to nitrogen, air, carbon dioxide, hydrogen, helium, and argon, are stored in caverns, whether leached in salt formations or created by hard rock mining. A minimum volume of gas is stored in the cavern to provide adequate pressure to maintain the integrity of the cavern and prevent the cavern roof from collapsing and to keep the cavern walls from moving inward. This minimum volume of gas is called the pad gas or base gas. The amount of gas stored in addition to the pad gas or base gas volume is called the working gas or working inventory. Business opportunities can require removing more gas volume from the cavern than the working gas volume. To meet this business need, the volume of pad gas or base gas can be reduced to provide additional volume. For the purpose of this invention, the definition of high pressure is defined as a pressure at or above 10 atm. For the purpose of this invention, the definition of cavern integrity is defined as the ability of the cavern to hold static pressure when blocked in for 48 hours such that the cavern gas pressure does not decrease for 48 hours when all flows in and out of the cavern are stopped.

SUMMARY

A method of pad gas management in an underground storage volume is provided. In one embodiment of the present invention, the gas pad management method includes storing a first compressible fluid in an underground storage volume, determining a transient minimum operating pressure ($P_{trans}$) for said underground storage volume, measuring the pressure ($P_{act}$), of said underground storage volume, removing at least a portion of said first compressible fluid from said underground storage volume, concurrently, introducing an incompressible fluid into said underground storage volume, thereby producing a transient pressure condition, wherein the transient pressure condition is controlled by the flow rate of said incompressible fluid, such that $P_{trans} < P_{act}$.

The method may include an underground storage volume that is an underground salt cavern. The first compressible fluid may be selected from the group consisting of nitrogen, air, carbon dioxide, hydrogen, helium, and argon. The first compressible fluid may be hydrogen. The incompressible fluid may be selected from the group consisting of brine, water, or water slurry.

The method may also include a length of casing, permanently cemented into the surrounding rock formations, with a final cemented casing shoe defining the practical endpoint at an approximate depth ($D_{casing}$), determining a transient pressure gradient ($G_{trans}$) for said underground storage volume, wherein $P_{trans} < D_{casing} \times G_{trans}$.

The method may be such that 0.2 psi/ft of depth$<G_{trans}<$0.3 psi/ft of depth. The method may be such that 0.25 psi/ft of depth$<G_{min}$. The incompressible fluid may not exceed a predetermined maximum flow rate ($F_{max}$). The predetermined maximum flow rate may be such that $F_{max}$ is 20 feet per second.

In another embodiment of the present invention, a method of pad gas management in an underground storage volume is provided, comprising storing a first compressible fluid in an underground storage volume, determining a transient minimum operating pressure ($P_{trans}$) for said underground storage volume, measuring the pressure ($P_{act}$), of said underground storage volume, removing at least a portion of said first compressible fluid from said underground storage volume, wherein the maximum removal of said first compressible fluid is controlled such that $P_{min} < P_{act}$, and wherein said transient pressure condition has a duration (D) of less than a predetermined period of time. The duration of the transient period may be less than 7 days. The duration of the transient period may be less than 5 days.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 illustrates an embodiment of the current invention.

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The safe operating pressure range for high pressure gas caverns is defined as the pressure between the minimum pressure and maximum pressure of the cavern. The minimum operating pressure is a function of the depth of the last cemented pipe casing shoe and the minimum pressure gradient, which is determined for the evaluation of the strength of the salt or rock formation and is typically of a value of 0.3 psi to 0.35 psi per foot of depth. The maximum operating pressure is a function of the depth of the last cemented pipe casing shoe and the maximum pressure gradient typically defined by regulatory statute and is typically of a value of 0.8 psi to 0.85 psi per foot of depth.

In one embodiment of the present invention, it is claimed that to maintain the cavern at a safe minimum operating pressure while removing pad gas or base gas, liquid, either brine, water or a combination of brine and water, is pumped into the cavern. The cavern pressure is monitored by pressure indicators on the wellhead and piping. Liquid is pumped into the cavern and gas is withdrawn at rates that maintain the cavern pressure between the minimum and maximum safe operating pressures. The volume of liquid and gas moved into and out of the cavern are measured by flow meters.

This invention further claims that the maximum depth of pad gas or base gas that is stored in the cavern is determined by the depth of the brine casing and a weep hole that is cut into the brine casing 10 ft from the bottom opening. The weep hole can be triangular, round, square or other geometry. The weep hole allows gas to enter the brine casing as an indicator that the cavern is filled to the desired depth.

This invention further claims that a cavern minimum pressure as low at 0.25 psi per foot of cemented casing depth can be maintained for a very short duration, typically 5 to 7 days. This very low pressure is brought back to the desired cavern operating range by injection of additional gas volume or by injection of additional liquid or by injection of both additional liquid and gas at the same time.

After operation of a cavern at very low pressures, a static pressure test may be necessary to ensure cavern integrity has been maintained. A cavern that does not demonstrate integrity in a static pressure test may require additional testing such as a gas—liquid interface test and/or sonar to demonstrate integrity.

Turning to FIG. 1, compressible fluid 103 is stored in underground storage volume 102. Underground storage volume 102 may be a salt cavern, a depleted reservoir in an oil or gas field, an aquifer, or any system know to one skilled in the art. The underground storage volume 102 may have a first conduit 101 for admitting or removing the compressible fluid 103. The underground storage volume 102 may contain an incompressible fluid 104. Incompressible fluid 104 may be water, water slurry, brine, diesel, or any appropriate fluid known to one skilled in the art. The underground storage volume 102 may have a second conduit 105 from admitting or removing incompressible fluid 104.

As the underground storage volume may be at a considerable depth below grade 107, the nominally vertical portions of first conduit 101 and/or second conduit 105 may be anchored into the surrounding rock formations by means of a cemented casing 106. The depth of the casing from grade 107 to the limit of the cemented casing 106 is the depth of the casing $D_{casing}$.

In one embodiment of the present invention, a method of pad gas management in an underground storage volume is provided. Compressible fluid 103 is stored in underground storage volume 102. Compressible fluid 103 may be nitrogen, air, carbon dioxide, hydrogen, helium, and argon. A transient minimum operating pressure ($P_{trans}$) is then determined for underground storage volume 102. A transient pressure gradient ($G_{trans}$) is established for underground storage volume 102, such that $P_{trans} < D_{casing} \times G_{trans}$. The actual pressure ($P_{act}$), of underground storage volume 102 is measured.

During normal operation of underground storage volume 102, at least a portion of compressible fluid 103 may be removed through conduit 101. Concurrently, incompressible fluid 104 may be introduced into underground storage volume 102 through conduit 105, thereby minimizing the resulting transient pressure condition.

The transient pressure condition may be controlled by the flow rate of incompressible fluid 104, such that $P_{trans} < P_{act}$. $G_{trans}$ may be such that 0.2 psi/ft of depth $< G_{trans} < 0.3$ psi/ft of depth. $G_{trans}$ may be such that 0.25 psi/ft of depth $< G_{min}$. The maximum flow rate of incompressible fluid 104 may not exceed a predetermined maximum flow rate ($F_{max}$). $F_{max}$ may not exceed 20 feet per second.

In another embodiment of the present invention incompressible fluid 104 may not be introduced into underground storage volume 102 through conduit 105.

The transient pressure condition may then be controlled by the flow rate of compressible fluid 103, such that $P_{trans} < P_{act}$. $G_{trans}$ may be such that 0.2 psi/ft of depth $< G_{trans} < 0.3$ psi/ft of depth. $G_{trans}$ may be such that 0.25 psi/ft of depth $< G_{min}$. The transient pressure condition in the embodiment where no incompressible fluid is introduced to minimize the transient pressure, may have a duration (D) of less than a predetermined period of time. The duration of the transient pressure condition (D) may be less than 7 days, preferably less than 5 days.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of pad gas management in a salt cavern, comprising:
   storing a volume of hydrogen in a salt cavern, wherein during normal operating conditions the cavern integrity is preserved by maintaining a minimum allowable pressure ($P_{Min}$) within the salt cavern by means of retaining a minimum volume of hydrogen ($V_{Min}$);
   removing at least a portion of said hydrogen from said salt cavern, thereby temporarily reducing the volume of hydrogen in the salt cavern to below the minimum volume thereby producing a transient minimum operating pressure ($P_{trans}$) for said salt cavern; and concurrently, introducing brine into said salt cavern, thereby producing a temporary operating condition wherein $P_{trans}<P_{min}$, wherein said temporary operating condition has a duration of less than 7 days.

2. The method of claim 1, further comprising:

a length of casing, permanently cemented into surrounding rock formations, with a final cemented casing shoe defining the practical endpoint at a depth ($D_{casing}$); and determining a transient pressure gradient ($G_{trans}$) for said salt cavern, wherein $P_{trans}<D_{casing}\times G_{trans}$.

3. The method of claim 2, wherein 0.2 psi/ft of depth$<G_{trans}<$0.3 psi/ft of depth.

4. The method of claim 1, wherein said a does not exceed a predetermined maximum flow rate ($F_{max}$).

5. A method of pad gas management in a salt cavern, comprising:

storing a volume of hydrogen in a salt cavern, wherein during normal operating conditions the cavern integrity is preserved by maintaining a minimum allowable pressure ($P_{Min}$) within the salt cavern by means of retaining a minimum volume of hydrogen ($V_{Min}$);

removing at least a portion of said hydrogen from said salt cavern, thereby temporarily reducing the volume of hydrogen in the salt cavern to below the minimum volume thereby producing a transient minimum operating pressure ($P_{trans}$) for said salt cavern, thereby producing a temporary operating condition wherein $P_{trans}<P_{min}$, wherein said temporary operating condition has a duration of less than 7 days.

6. The method of claim 5, further comprising:

a length of casing, permanently cemented into surrounding rock formations, with a final cemented casing shoe defining the practical endpoint at a depth ($D_{casing}$); and determining a transient pressure gradient ($G_{trans}$) for said salt cavern, wherein $P_{trans}<D_{casing}\times G_{trans}$.

7. The method of claim 6, wherein 0.2 psi/ft of depth$<G_{trans}<$0.3 psi/ft of depth.

* * * * *